(12) United States Patent
Stark

(10) Patent No.: US 8,065,809 B1
(45) Date of Patent: Nov. 29, 2011

(54) ANGLE MEASUREMENT DEVICE

(76) Inventor: Shaune R. Stark, Cedar Park, TX (US)

(*) Notice: Subject to any disclaimer, the term of this patent is extended or adjusted under 35 U.S.C. 154(b) by 0 days.

(21) Appl. No.: 12/770,149

(22) Filed: Apr. 29, 2010

Related U.S. Application Data

(60) Provisional application No. 61/173,754, filed on Apr. 29, 2009.

(51) Int. Cl.
*G01B 3/56* (2006.01)
(52) U.S. Cl. .......................................... 33/456; 33/1 N
(58) Field of Classification Search .................. 33/1 N, 33/456, 458, 459, 469, 461, 462, 463, 471, 33/534
See application file for complete search history.

(56) References Cited

U.S. PATENT DOCUMENTS

| | | | | |
|---|---|---|---|---|
| 3,686,963 | A * | 8/1972 | Phatak | 33/27.1 |
| 4,019,256 | A * | 4/1977 | Johnson | 33/441 |
| 4,527,341 | A * | 7/1985 | Schon | 33/455 |
| 4,729,173 | A * | 3/1988 | Wilson | 33/451 |
| 4,766,675 | A * | 8/1988 | Liu | 33/529 |
| 5,384,967 | A * | 1/1995 | Helmuth | 33/456 |
| 2007/0220766 | A1 * | 9/2007 | Cooke | 33/456 |

* cited by examiner

*Primary Examiner* — G. Bradley Bennett
(74) *Attorney, Agent, or Firm* — Rory D. Rankin; Meyertons, Hood, Kivlin, Kowert & Goetzel, P.C.

(57) ABSTRACT

A device for measuring angles between surfaces of a physical object includes a linkage having two or more gauging arms and a metered arm. The metered arm is coupled to one arm of the linkage. The metered arm indicates an angle between two or more surfaces of the physical object. The angle measurement device may allow measurement of both interior and exterior angles, and acute, obtuse, and right angles.

20 Claims, 3 Drawing Sheets

ANGLE MEASUREMENT DEVICE

CROSS REFERENCE TO RELATED APPLICATIONS

This application claims the benefit of priority to U.S. Provisional Patent Application No. 61/173,754, entitled "Angle Measurement Device," filed Apr. 29, 2009, the entirety of which is incorporated herein by reference.

BACKGROUND

1. Field of the Invention

Embodiments of the invention generally relate to apparatus and methods for measuring physical objects, such as in carpentry. More particularly, embodiments of the invention relate to apparatus and method for measuring and replicating angles between surfaces of one or more physical objects.

2. Description of Related Art

Carpenters often wish to measure and replicate angles. One tool used by carpenters is a T-bevel square. A T-bevel square is used to replicate an angle by aligning the two sides of the square with the sides of the angle. A protractor is then used to measure the angle formed by the T-bevel square.

Another method of measuring angles is to use a digital angle finder. A digital angle finder uses an electronic device to measure the angular separation between two rotating arms. Some existing digital angle finders may not be able to measure small angles in fine or finish carpentry because of their widths.

SUMMARY

Various embodiments of apparatus and methods for measuring and replicating angles are disclosed. In an embodiment, a device for measuring angles between surfaces of a physical object includes a linkage including two or more gauging arms and a metered arm. The metered arm is coupled to one arm of the linkage. The metered arm indicates an angle between two or more surfaces of the physical object. The angle measurement device may allow measurement of both interior and exterior angles, and acute, obtuse, and right angles. In some embodiments, the arms of the linkage and the metered arm are foldable.

In one embodiment, a linkage for an angle measurement device includes a base arm, an indicator arm, and two gauging arms. The arms form an equilateral triangle when the gauging arms are aligned with one another. During use, the measured angle is indicated at the intersection of the metered arm with the indicator arm. The angle measurement device may allow both interior and exterior angles to be measured on a common scale.

In one embodiment, a device for measuring angles between surfaces of a physical object includes a linkage and a metered arm. The linkage includes a base arm and an indicator arm. The indicator arm is coupled to the base arm and includes a pin. The metered arm coupled to the base arm of the linkage. The metered arm may be coupled with the indicator arm such that the pin travels along the metered arm and such that the position of the indicator arm along the metered arm indicates an angle between two or more surfaces of the physical object. In some embodiments, the metered arm includes a radially arcuate channel. The pin of the indicator arm can travel along the radially arcuate channel when the metered arm is coupled with the indicator arm. The position of the pin along the radially arcuate channel may indicate the angle between the two or more surfaces of the physical object. In certain embodiments, the linkage forms an equilateral triangle when the gauging arms are aligned, and the measurement device can be used to measure interior and exterior angles on a common scale In an embodiment, a method for measuring angles between surfaces of a physical object includes deploying a metered arm to a measuring position with respect to a linkage; positioning a first gauging arm of the linkage on a first surface of an object to be measured; positioning a second gauging arm of the linkage on a second surface of an object to be measured; and reading a value on the metered arm.

BRIEF DESCRIPTION OF THE DRAWINGS

Advantages of the present invention will become apparent to those skilled in the art with the benefit of the following detailed description and upon reference to the accompanying drawings in which.

Figure 1:
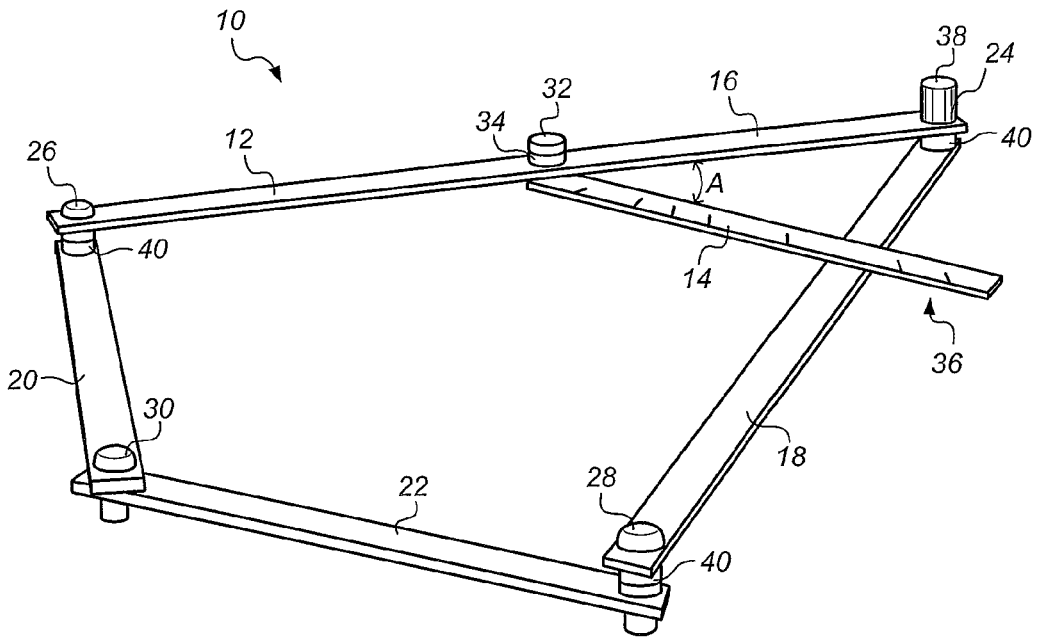
FIG. 1 illustrates an embodiment of an angle measurement device.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims. The headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means directly or indirectly coupled.

DETAILED DESCRIPTION OF ILLUSTRATIVE EMBODIMENTS

FIG. 1 illustrates one embodiment of an angle measurement device. Angle measurement device 10 includes linkage 12 and metered arm 14. Linkage 12 includes base arm 16, indicator arm 18, and gauging arms 20 and 22. Base arm 16 is coupled to indicator arm 18 at hinge joint 24. Gauging arm 20 is coupled to base arm 16 at hinge joint 26. Gauging arm 22 is coupled to indicator arm 18 at hinge joint 28. Gauging arms 20 and 22 are coupled to one another at hinge joint 30. It is noted that while the figures depict arms 16, 18, 20 and 22 as having squared ends, in other embodiments rounded ends may be utilized for one or more of the arms. The use of rounded ends may, for example, serve to prevent damage to delicate surfaces during use which may otherwise occur while using squared ends.

Metered arm 14 is coupled to base arm 16 at hinge joint 32. Angle measurement device 10 includes metered arm locking device 34. During use of angle measurement device 10 to measure an angle, metered arm 14 may be unfolded relative to base arm 16 (such as angle A shown in FIG. 1). Metered arm locking device 34 may maintain metered arm 14 at a fixed angle relative to base arm 16 during measurement. In one embodiment, metered arm locking device 34 is a locking hinge.

Angle measurement device 10 includes linkage locking device 38. In one embodiment, linkage locking device 38 is a thumbscrew. Linkage locking device 38 may allow a user to fix the arms of linkage 12 in a fixed angular relationship to one another. Although in the embodiment shown in FIG. 1, linkage locking device 38 is shown at joint 24, in other embodiments, a linkage locking device may be provided at other joints of a linkage, such as hinged joints 26, 28 or 30.

Figure 2:
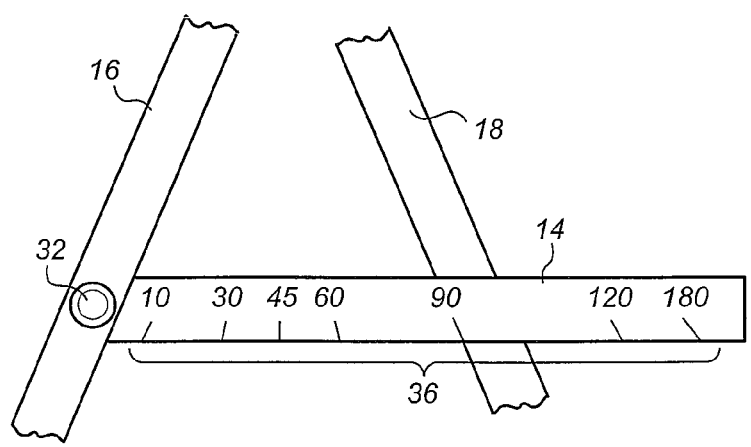
FIG. 2 is a detailed view of a scale portion of the angle measurement device shown in FIG. 1 according to one embodiment.

FIG. 2 illustrates a detail view of metered arm 14 of angle measurement device 10. Metered arm 14 includes scale 36. An intersection is formed where indicator arm 18 crosses metered arm 14. The location of the intersection varies depending on the angles among metered arm 14, base arm 16, and indicator arm 18. In one embodiment, to measure an angle using angle measurement device 10, angle measurement device 10 may be extended into the shape of an equilateral triangle. The exterior side of the triangle formed by gauging arms 20 and 22 may be pressed onto the surfaces of the object to be measured (see, for example, FIG. 4). When gauging arms 20 and 22 align with the surfaces of the object, linkage locking device 38 may be tightened by the user, preserving the angle. The measurement of the angle may be read from scale 36 on metered arm 14 by observing the value indicated at the intersection of the edge of meter arm 14 and the edge of indicator arm 18 (as shown, for example, in FIG. 2). In various embodiments, scale 36 may be metered in a variety of increments. For example, gauge 36 increments may be in 1, 2, 5, or any other desired number of degrees or units of measure.

Figure 3:
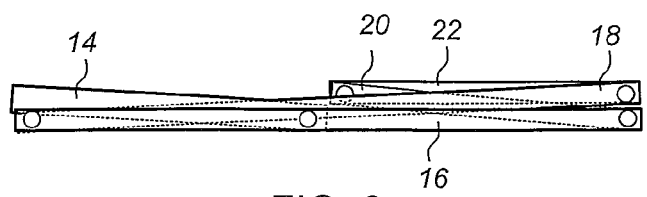
FIG. 3 illustrates the angle measurement device shown in FIG. 1 in a folded position.

Hinge joints 24, 26, 28, and 30 between the various adjoining arms of linkage 12, and hinge joint 32 between metered arm 14 and base arm 16, allow angle measurement device to be placed into a folded position. FIG. 3 illustrates angle measurement device 10 in a folded position. As shown in FIG. 1, various joints may include spacers 40. Spacers 40 may allow arms of angle measurement device 10 to at least partially stack on top of on another when angle measurement device 10 is in a folded position.

Figure 4:
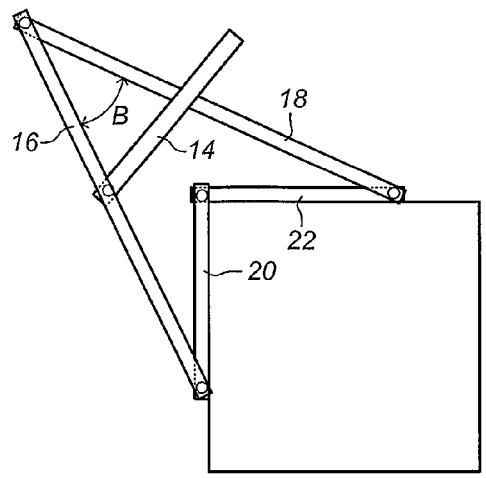
FIG. 4 illustrates measurement of a right angle exterior corner of an object.
Figure 5:
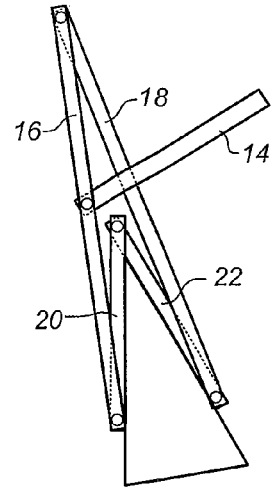
FIG. 5 illustrates measurement of an acute angle exterior corner of an object.
Figure 6:
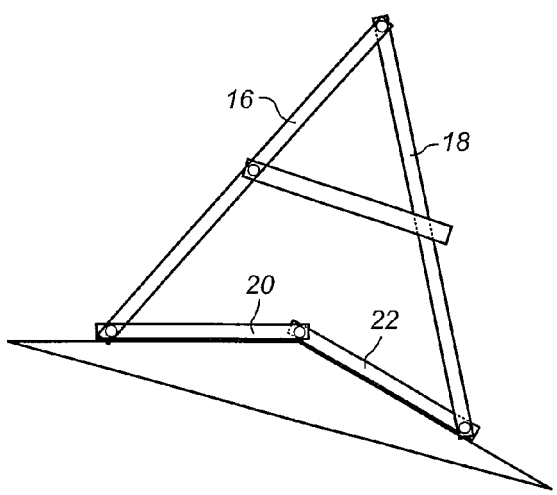
FIG. 6 illustrates measurement of a obtuse angle exterior corner of an object.
Figure 7:
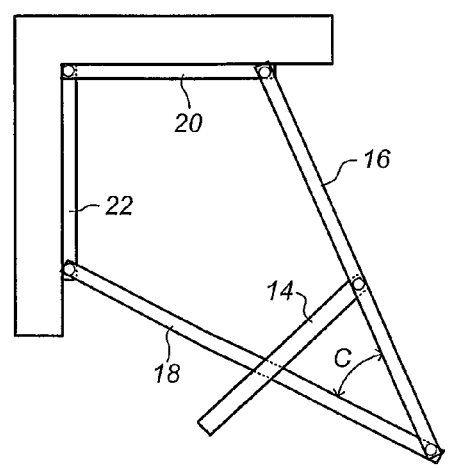
FIG. 7 illustrates measurement of a right angle interior corner of an object.

In some embodiments, an angle measurement device can be used to measure and replicate acute, obtuse, and right angles. In some embodiments, an angle measurement device can be used to measure and replicate both exterior and interior angles. For example, angle measurement device 10 can be used to selectively measure acute, obtuse, and right exterior angles and acute, obtuse, and right interior angles using gauging arms 20 and 22. FIG. 4 illustrates measurement of a right angle exterior corner of an object. FIG. 5 illustrates measurement of an acute angle exterior corner of an object. FIG. 6 illustrates measurement of an obtuse angle exterior corner of an object. FIG. 7 illustrates measurement of a right angle interior corner of an object.

In some embodiments, an angle measurement device includes a common scale that is used for measuring both interior and exterior angles. In one embodiment, the lengths of the arms of a measurement device may be such that a metering arm reads the same value when the gauging arms are measuring an interior angle of an object as when they are measuring an exterior angle of equal value (such as a 30 degree interior angle and a 30 degree exterior angle). In angle measurement device 10 shown in FIG. 1, for example, base arm 16 and indicator arm 18 may each be of effective length L, and the combined length of gauging arms 20 and 22 when aligned with one another may be equal to effective length L, such that linkage 12 forms an equilateral triangle when gauging arms 20 and 22 are aligned with one another. For any given angle between gauging arms 20 and 22, whether for an interior or an exterior measurement, the angle between base arm 16 and indicator arm 18 will be the same, and thus the position of indicator arm 18 on scale 36 will be the same. For example, when angle measurement device 10 is used to measure the 90 degree exterior corner shown in FIG. 4, the angle between base arm 16 and indicator arm 18 (indicated as angle "B") will be the same as the angle between base arm 16 and indicator arm 18 when the angle measurement device 10 is used to measure an interior 90 degree corner as shown in FIG. 7 (indicated as angle "C").

In certain embodiments, a scale arm may include notches, detents, or stops corresponding to particular angles. For example, metered arm 14 may include notches to hold indicator arm 18 relative to metered arm 14 where the instrument reads 90 degrees, and such that gauging arms 20 and 22 are maintained at a 90 degree angle with respect to one another.

In the embodiment illustrated in FIG. 1, linkage 12, which includes arms 16, 18, and 20, and 22 is a "four-bar" linkage. In other embodiments, an angle measurement device may include a different number of links. In certain embodiment, links of an angle measurement device may be coupled with other degrees of freedom, such as fixed connection or a sliding connection.

Figure 8:
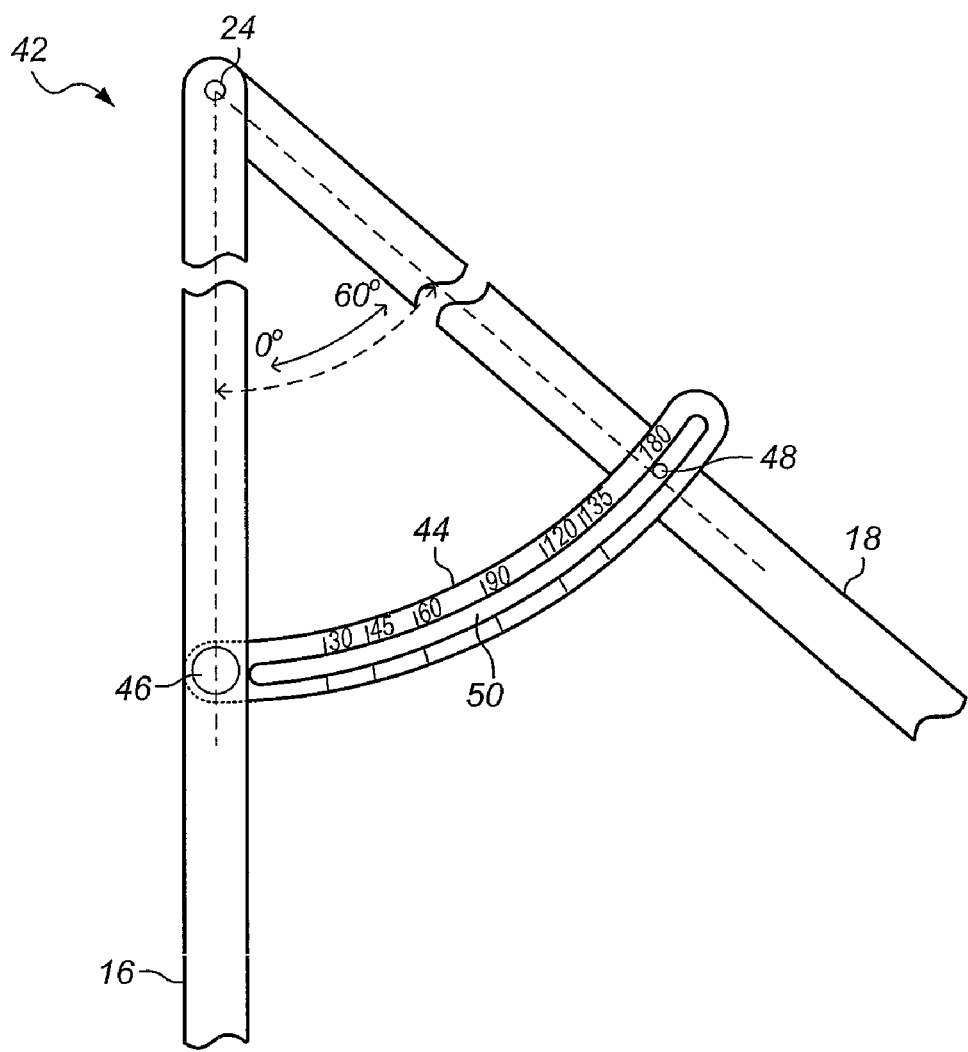
FIG. 8 is a partial view of an angle measurement device having an indicator with a pin that travels along a channel in a metered arm according to one embodiment.

In some embodiments, an indicator arm may movably couple with a metered arm. FIG. 8 is a partial view of an angle measurement device having an indicator with a pin that travels along a channel in a metered arm, according to one embodiment. Angle measurement 42 includes base arm 16 and indicator arm 18. Base arm 16 and indicator arm 18 may each be coupled to a gauging arm. The gauging arms may be arranged in a manner similar to that of angle measurement device 10 described above relative to FIG. 1.

Angle measurement device 42 includes metering arm 44. Metering arm 44 is coupled to base arm at joint 46. In some embodiments, joint 46 is a hinged joint, similar to hinge joint 32 described above relative to FIG. 1. In other embodiments, joint 46 is a fixed joint. In a fixed joint, metered arm 46 may remain at a fixed angle relative to base arm 16.

Indicator arm 18 includes pin 48. Metered arm 44 includes channel 50. In some embodiments, pin 48 is press-fit into indicator arm 18. As indicator arm 48 is angulated relative to base arm 16, pin 48 may travel along channel 50. In certain embodiments, pin 48 slides along channel 50. The position of pin 48 of indicator arm 18 along metered arm 44 may provide an indication of the angle between the gauging arms of angle measurement device 42.

As is illustrated in FIG. 8, channel 48 may be arcuate in shape. In some embodiments, the center of curvature of channel 48 may coincide with hinge joint 24 between base arm 16 and indicator arm 18. In certain embodiments, the shape of the metered arm (such as the exterior edges of the metered arm) may also be arcuate and have a center of curvature at hinge joint 24.

In some embodiments, metered arm 44 and indicator arm 18 are separable from one another. For example, pin 48 of indicator arm 18 may be withdrawn from channel 50 of metered arm 44. In some embodiments, metered arm 44, indicator arm 50, or both, may be flexible to facilitate withdrawal of pin 48 from channel 50.

In certain embodiments, metered arm 44 and pin 48 may resiliently engage one another. Metered arm 44, pin 48, or both, may be spring-loaded. In certain embodiments, pin 48 may snap into channel 50. A snap-in and/or spring-loaded arrangement may help to maintain a stable connection between indicator arm 18 and metered arm 50 during use of angle measurement device 42. Pin 48 may be snapped out of engagement with metered arm 50 to allow metered arm 44 and indicator arm 18 to be folded when angle measurement device 42 is not in use.

As used herein, "arcuate" means in the shape of an arc. As used herein, "radially arcuate" means having an arcuate shape that has a center of curvature of substantially constant radius over at least over at least a portion of an element or feature of an element. In some embodiments, a radially arcuate element or feature of an element, such as a channel, has a center a curvature that coincides with a particular element or feature on a measurement device, such as at a pivot point between two links of the measurement device.

As used herein, an "arm" includes any member of mechanical device. An arm may be, for example, a link of a linkage. An arm may be straight, curved, or a combination thereof. An arm may be a single component or a combination of two or more components. In some embodiments, the arms of a measuring device are rigid. In certain embodiments, certain arms of a measuring device may be semi-rigid or flexible.

As used herein, a "channel" includes any elongated opening, recess, pocket, groove, or slot in an element. A channel may extend through entire thickness of an element, or it may extend for only a portion of the thickness of an element. A channel may be straight, curved, or a combination thereof.

As used herein, a "gauging" element includes any element that can be aligned or placed in contact with a surface or other physical feature of a physical object (such as an edge, side, or ridge) to take a measurement with respect to the feature, such as an angle or a dimension. For example, a pair of gauging arms hinged to one another may be used to measure an angle between two adjacent surfaces of an object.

As used herein, a "hinged joint" includes any joint that allows one member to pivot or rotate with respect to another member.

As used herein, a "linkage" means a combination of two or more links connected to one another at one or more joints.

As used herein, "lock" means to hold an element in place with respect to at least one other element until a user performs an action to unlock the mechanism. As used herein, locking device includes any element or combination of elements that holds a member in place until a user performs an action to unlock. In one embodiment, a locking device includes a locking hinge. In certain embodiments, a locking device (e.g., metered arm locking device 34 or linkage locking device 38) may automatically unlock (or "passively" unlock) when the user performs an action for another purpose (e.g., folding a device for storage). For example, in certain embodiments, when a user attempts to fold angle measurement device 10 for storage, metered arm locking device 34 may unlock when the user applies a sufficient amount of folding force. In other embodiments, unlocking may involve a dedicated unlocking action, such as pushing a button or turning a knob. In certain embodiments, one or more of joints of a linkage may include a detent mechanism, such as a spring-loaded ball detent device. A detent mechanism may hold in a deployed position until a sufficient amount of force is applied to overcome the holding force of the detent mechanism. For example, a detent mechanism may hold scale arm 18 in a measurement position until a user applies a sufficient amount of folding force to overcome the detent.

As used herein, "metered" refers to an element that has one or more markings for use in indicating a measurement. For example, a metered arm may include a scale with tick marks corresponding to various angles. The markings on the scale may be calibrated to accurately indicate a measurement.

As used herein, a "pin" includes any element can pass through at least a portion of an opening, groove, or channel. In some embodiments, a pin at least partially restrains movement between two or more elements. For example, an pin may slide against one or more of the sides of a channel. A pin may take any of various forms, including a cylindrical column, a bar, a rod, the shank of a screw, or other form. A pin may be straight, curved, or a combination thereof.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A device for measuring angles between surfaces of a physical object, comprising:
   a linkage comprising two or more gauging arms; and
   a metered arm coupled to at least a first arm of the linkage, wherein the metered arm is configurable to indicate an angle between two or more surfaces of the physical object,
   wherein the device is configurable to measure both interior angles and exterior angles using a same pair of gauging arms.

2. The device of claim 1, wherein the metered arm is pivotally connected to the first arm of the linkage and foldable with respect to at least the first arm of the linkage.

3. The device of claim 1, wherein the device is configurable to measure both interior and exterior angles on a common scale.

4. The device of claim 1, wherein the first arm of the linkage is a base arm, wherein the linkage further comprises an indicator arm pivotally coupled to the base arm, wherein the base arm, the indicator arm, and the gauging arms combine in a linkage that forms an equilateral triangle when the gauging arms are aligned with one another.

5. The device of claim 1, wherein the first arm is a base arm, wherein the linkage further comprises an indicator arm, wherein the metered arm is configurable to slidably or freely move relative to the indicator arm, wherein the angle is indicated based on a position of the indicator arm relative to a scale on the metered arm.

6. The device of claim 1, wherein the first arm is a base arm, wherein the linkage further comprises an indicator arm, wherein the indicator arm comprises a pin, wherein the pin is configurable to travel along at least a portion of the metered arm.

7. The device of claim 6, wherein the angle between the two or more surfaces of the physical object is indicated by the position of the pin on the metered arm.

8. The device of claim 1, wherein the first arm is a base arm, wherein the linkage further comprises an indicator arm pivotally coupled to the base arm at a pivot point, wherein the metered arm comprises a channel having an arcuate portion, wherein a center of curvature of at least a portion of the arcuate portion of the channel is substantially at the pivot point.

9. The device of claim 1, wherein the first arm is a base arm, wherein the linkage further comprises an indicator arm, wherein the base arm is pivotally connected to the indicator arm at a pivot point, wherein the metered arm is configurable to slidably couple with the indicator arm at a substantially fixed distance from the pivot point.

10. A device for measuring angles between surfaces of a physical object, comprising:
    a linkage comprising:
        a base arm; and
        an indicator arm coupled to the base arm and comprising a pin; and
    a metered arm coupled to the base arm of the linkage, wherein the metered arm is configurable to slidably couple with the indicator arm such that the pin travels along at least a portion of the metered arm and such that the position of the pin along the metered arm indicates an angle between two or more surfaces of the physical object, and wherein the metered arm and the indicator arm are separable from one another by hand.

11. The device of claim 10, wherein at least a portion of the metered arm comprises a radially arcuate channel, wherein the pin of the indicator arm is configurable to travel along at least a portion of the radially arcuate channel when the metered arm is coupled with the indicator arm.

12. The device of claim 11, wherein the base arm is pivotally connected to the indicator arm at a pivot point, wherein a center of curvature of at least a portion of the radially arcuate channel is substantially at the pivot point.

13. The device of claim 11, wherein a position of the pin along the radially arcuate channel indicates the angle between the two or more surfaces of the physical object.

14. The device of claim 10, wherein the base arm is pivotally connected to the indicator arm at a pivot point, wherein the metered arm comprises a radially arcuate portion, wherein a center of curvature of at least part of the radially arcuate portion of the metered arm is substantially at the pivot point.

15. The device of claim 10, wherein the linkage further comprises a first gauging arm coupled to the base arm and a second gauging arm coupled to the indicator arm.

16. The device of claim 15, wherein the linkage forms an equilateral triangle when the gauging arms are aligned, wherein the measurement device is configurable to measure interior and exterior angles on a common scale.

17. The device of claim 10, wherein the metered arm and the indicator arm are configured to resiliently engage one another when the metered arm is coupled to the indicator arm.

18. The device of claim 10, wherein metered arm and the indicator arm are configurable to disconnect from one another, wherein the metered arm and the indicator arm are configured to at least partially fold with respect to the base arm when the metered arm and the indicator arm are disconnected from one another.

19. The device of claim 1,
    wherein the first arm is a base arm, wherein the linkage further comprises an indicator arm, wherein the base arm is pivotally connected to the indicator arm,
    wherein, for the pair of gauging arms used to measure both interior angles and exterior angles, one gauging arm of the pair of gauging arms is pivotally coupled to the base arm, the other gauging arm of the pair of gauging arms is pivotally coupled to the indicator arm, and each gauging arm of the pair of gauging arms is pivotally coupled to the other one of the pair of gauging arms.

20. A device for measuring angles between surfaces of a physical object, comprising:
    a linkage comprising a base arm, an indicator arm, and two or more gauging arms, wherein the base arm and the indicator arm are pivotally coupled to one another such that the base arm, the indicator arm, and at least two of the gauging arms form a four-bar linkage; and
    a metered arm pivotally coupled to the base arm of the four-bar linkage, wherein the metered arm is configurable to indicate an angle between two or more surfaces of the physical object.

* * * * *